United States Patent [19]

Raque et al.

[11] 4,184,423

[45] Jan. 22, 1980

[54] SLICER DEVICE

[76] Inventors: Glenn F. Raque, 11107 Ainwick Ct., Louisville, Ky. 40243; Edward A. Robinson, 8914 Pine Lake Dr., Louisville, Ky. 40220

[21] Appl. No.: 940,258

[22] Filed: Sep. 7, 1978

[51] Int. Cl.² ........................ A23P 1/00; A23N 15/00; B26D 3/24

[52] U.S. Cl. ........................................ 99/537; 83/431

[58] Field of Search .................... 99/537; 83/425, 431, 83/437, 857

[56] References Cited

U.S. PATENT DOCUMENTS

| | | | |
|---|---|---|---|
| 1,118,923 | 12/1914 | Cummings | 83/431 X |
| 1,765,310 | 6/1930 | Reynolds | 83/431 X |
| 2,492,260 | 12/1949 | Bingham | 83/431 X |
| 2,560,229 | 7/1951 | Leavens | 99/537 X |
| 3,187,432 | 6/1965 | Cuomo | 83/431 X |
| 3,273,617 | 9/1966 | Lamb | 83/431 X |
| 3,351,110 | 11/1967 | Willis et al. | 99/537 |
| 3,373,785 | 3/1968 | Anderson | 99/537 |
| 3,830,151 | 8/1974 | Gerson | 99/537 |

FOREIGN PATENT DOCUMENTS

| | | | |
|---|---|---|---|
| 379705 | 8/1964 | Switzerland | 99/537 |

*Primary Examiner*—Stanley N. Gilreath
*Attorney, Agent, or Firm*—Edward M. Steutermann

[57] ABSTRACT

A cutting device for cutting generally round objects into sections including a generally circular table adapted for rotation in a horizontal plane about a central longitudinal axis where the table includes at least one aperture of selected diameter greater than the diameter of the objects and located in spaced relation within the periphery of the table where the center of the apertures lie generally on a circle having a radius less than the radius of the table, object receiving stations located on the upper surface of the table, one receiving station being in generally aligned relation with each aperture of the table and including a deformable support means overlying the respective aperture and adapted to permit the object to be sectioned to pass therethrough, pusher means located above the deformable support to be selectively actuated to urge the object to be sectioned through said deformable support means and the cooperative aperture of the table, cutter means having at least one blade located in aligned relation with the pusher means whereby the object to be sectioned is pressed through the deformable support means and the associated aperture of the table means and downwardly through the cutter means to slice the object to be sectioned into a selected number of slices, and indexing drive means to rotate the table from a first position where the object to be sectioned is placed on the deformable support means to a second position where the deformable support carrying the object to be sectioned is located beneath the pusher means, and to actuate the pusher means to force the object to be sectioned through the deformable support means and the cutter means when the table is in the second position whereby the object to be sectioned is cut, and then to retract the pusher means from the deformable support means and rotate the table means.

8 Claims, 5 Drawing Figures

SLICER DEVICE

BACKGROUND OF THE INVENTION

The present invention relates to a cutting apparatus to cut generally round objects into a selected number of sections determined by the configuration of the cutter blades associated with the device.

The present invention is particularly useful for rapidly sectioned fruit or vegetables such as, for example, apples, pears, oranges, tomatoes or potatoes.

Such devices are useful in applications where a high-speed cutter device is needed in the preparation of foods for further processing or for serving.

One such application is in food processing plants where various items of food, such as apples, pears, tomatoes or oranges, are cut into sections prior to further processing, for example, cooking or juicing.

Also, the advent of school lunch program nutritional standards necessitates in some cases the inclusion of fresh fruits and vegetables in school lunch programs and have led to high volume processing of fresh fruits and vegetables for mass feeding of students. In the case of school lunch programs, in part as a result of newly established standards as well as for purposes of economy, many jurisdictions now provide arrangements where lunches are packed at a central comissary and then delivered each day to the schools within the jurisdiction. The advent of such programs has resulted in the need and opportunity for high speed food processing and preparation equipment which can be efficiently utilized in the preparation of such lunches. Much of the foregoing applies to other situations such as hospitals or institutions of every type where mass feeding of standardized menus is utilized.

In any of the foregoing applications, the food processing equipment utilized must be designed and adapted to meet generally accepted, as well as local, sanitation rules applying to the preparation of food.

Various prior art devices are available for sectioning fruit or vegetables prior to further processing but insofar as presently known, such devices are complex, extremely expensive and generally require numerous moving parts with attendant maintenance and labor expense. Furthermore, no economical straightforward device is presently known to efficiently and rapidly slice fruits or vegetables into a selected number of sections prior to further processing or in the preparation of meals for immediate consumption.

SUMMARY OF THE INVENTION

The present invention provides a straightforward, inexpensive arrangement for simultaneously slicing two or more pieces of fruit or vegetables into a selected number of sections where the device has a minimum number of moving parts where the blade is fixed so the device complies with even the most stringent food preparation and sanitary standards where minimum time and labor is involved in cleaning such devices or adapting the devices for making other cuts in objects to be sectioned.

Moreover, the present invention provides an arrangement particularly well-adapted to cut fruit or vegetables such as apples, oranges or tomatoes into convenient and uniform sized sections, such as quarters, which avoids the complexity of prior art equipment and where maintenance and labor costs are minimized.

Briefly, the present invention provides devices to cut selected round objects, such as fruit, into a preselected number of sections including a generally circular table top having apertures located in the table top in generally equal spaced relation within the periphery of the table top where the centers of each of the apertures lie on a circle having a diameter less than the diameter of the table top and where the table top is adapted to be rotated about a generally vertical axis and in a horizontal plane, deformable object support means adapted to receive the objects to be sectioned where each object support station is adapted to support an object to be cut and then to allow the object to be cut to pass therethrough, plunger means to push the objects to be cut through the deformable support station, cutter means including blade means disposed beneath the table in aligned relation with the plunger means and disposed so that the plunger forces objects to be sectioned through the deformable support means and through the blades of the cutter means to cut the object into a selected number of sections dependent upon the number of blades provided in the cutter means, and index means to index the table top from a first position where objects to be cut are received on first deformable support means to a second place position where the first deformable support means is in aligned relation between the plunger means and the cutter means and to urge the plunger means from first rest position to second extended position pressing the object to be cut through the deformable support means and through the knife means, then retracting the plunger means.

BRIEF DESCRIPTION OF THE DRAWINGS

Referring to the drawings which illustrate one arrangement within the scope of the present invention, the example will be described in terms of:

Referring to FIG. 1, the example of the device in accordance with the present invention shown includes a hopper 1 to receive the objects, for example, apples, to be sliced. The apples are supplied through an opening (not shown) in the bottom of hopper 1 to a moving conveyor 2, driven as described hereinafter. The objects to be sectioned, for example, apples, move with conveyor 2 until they engage a cross-bar 3 extending between frame members 4, 4A on the lateral sides of the moving conveyor 2.

The assembly associated with conveyor 2 is carried by a frame assembly 6 which can be adapted to be carried on wheels 7 so the slicing assembly described herein can be adapted for movement.

The fruit to be sliced can be washed prior to placing in hopper 1 and the speed of conveyor 2 can be adapted by means not shown to approximately the speed at which the objects are sliced as hereinafter described.

Figure 1:
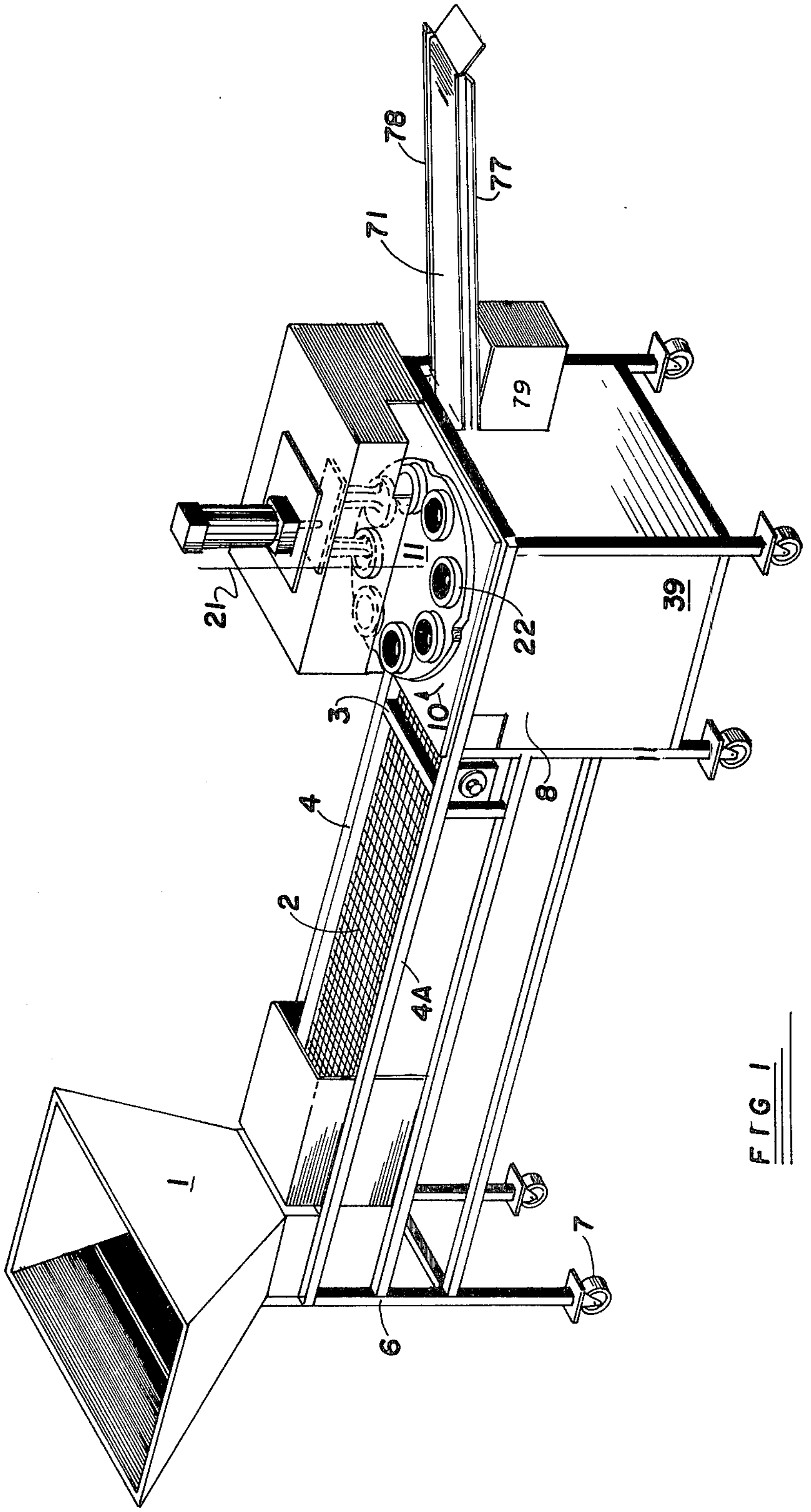
FIG. 1, which is a perspective view of one example of a device in accordance with the present invention.

Devices in accordance with the present invention provide a cutting station which in FIG. 1 is generally designated as 8.

Cutting station 8 includes a rotatable table 11 which can have a generally circular periphery of a selected diameter rotated by a shaft 46 (described hereinafter) to deliver objects to be sectioned to a cutting station, all as descirbed hereinafter.

Figure 2:
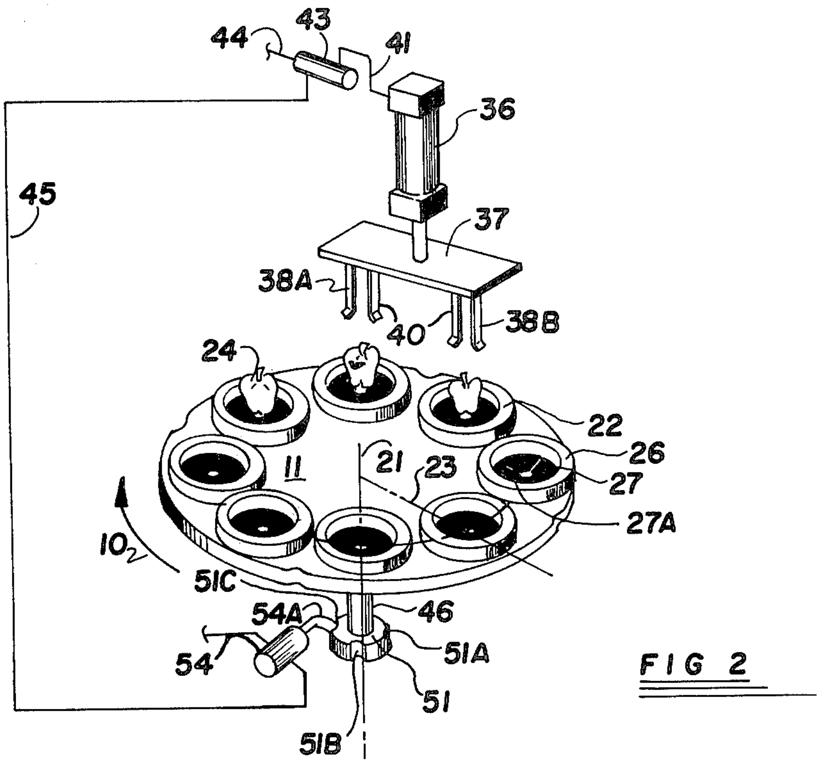
FIG. 2, which is an enlarged perspective view of a rotatable table for use in an apparatus in accordance with the present invention as shown in FIG. 1.

FIG. 2 is an isolated view of table 11 illustrating operation of one example in accordance with the present invention where table 11 rotates about an axis 21 on a shaft 46 and includes object receiving stations 22 disposed in spaced relation within the periphery of table 11 where the centers of each object receiving station advantageously fall on a circle having a radius less than the radius of table 11. In the example shown, eight object receiving stations 22 are provided on table 11 and each is adapted to receive, for example, apples 24. It will be recognized that within the scope of the present invention, any number of stations can be provided to receive objects to be sectioned where the maximum number of such stations is determined by the dimensions of table 11.

One of the object receiving stations 22 provided on table 11 of FIG. 2 is shown in detail in FIG. 3 where the assembly is held by concentric, overlying rings 26A and 26C adapted to receive a deformable support 27 (described hereinafter) therebetween. Advantageously, as shown, the upper surface of lower ring 26A and the lower surface of ring 26C can be chamferred to slope support 27 downwardly and inwardly as shown. Also, a groove 26B can be provided around the outer periphery of the lower edge of ring 26A and adapted to receive the periphery 16 defining a cooperative aperture in table 11. As previously described, table 11 provides such an aperture for each station 22 so that, as described in more detail hereinafter, the objects to be sectioned are placed on and urged through a deformable support, for example, support 27, then through the cooperative aperture in table 11, and through a cutter device as described hereinafter.

Figure 3:
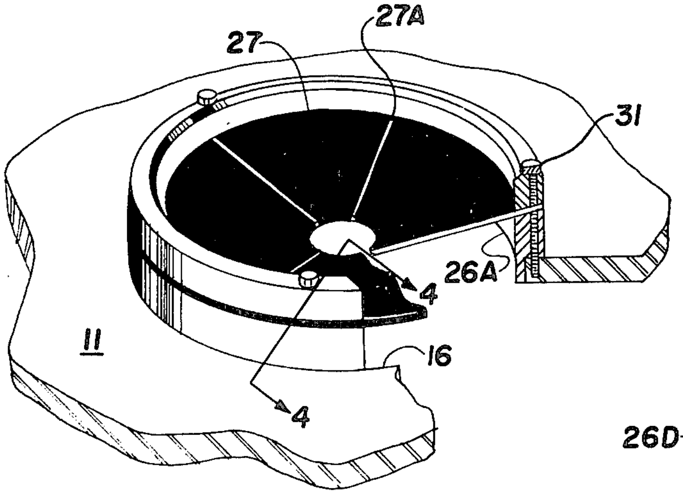
FIG. 3, which is an enlarged perspective view illustrating details of one example of a receiving station useful in devices of the type shown in FIG. 2.

More particularly, as shown in FIG. 3, overlying rings 26A and 26C are adapted to receive bolts 31 which are received in cooperative threaded apertures in table 11 to secure the receiving station to table 11.

Supports 27 can be of a flexible plastic, or rubber, and slits 27A can be provided to radiate from a central opening 27B provided in support 27. As previously described, the upper edge of ring 26A and the lower edge of ring 26C can be chamferred so that support 27 assumes a concave shape to form a pocket to receive the objects to be sectioned so that the object is centered in support 27.

Figure 4:
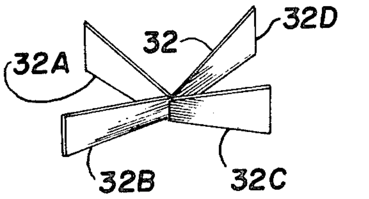
FIG. 4, which is an enlarged cross section view taken along a plane passing through line 4—4 of FIG. 3.
Figure 4:
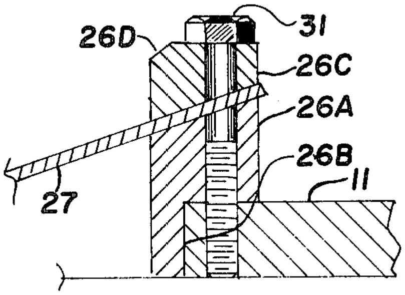

As also shown in FIG. 3 and described in more detail with respect to FIG. 4, cutter assemblies are located beneath, and in aligned relation with supports 27. As shown in FIG. 3, cutters can be provided with any selected number of blades to determine the number of sections to be formed. In the example shown in FIG. 3, the cutter assembly 32 is provided with four blades, 32A–32D, so the objects are cut into quarters. Within the scope of the present invention, various blade arrangements can be provided and, for example, can include cross section blades to cut potatoes for french frying. Also, the upper surfaces of blades 32 A–D can be sloped downwardly toward their mutual intersection and curved to form an upwardly open concave cutting arrangement to facilitate positioning of the article to be sliced.

Again referring to FIG. 2, table 11 rotates in the direction of arrow 10 where, as described hereinafter, the table is indexed so that on each cycle a new object on an object receiving station is positioned under each pusher 38A and 38B.

As shown in FIG. 2, pushers 38A and 38B are defined by separated fingers 40 where the fingers are disposed to define longitudinal spaces between the fingers. The fingers 40 also are provided with out-turned tips 40A so the inner sides of the tips contact the objects previously described where the pushers 38A and 38B are urged downwardly. Specifically, pushers 38A and 38B are carried by a platen 37 disposed for downward movement and in the example shown, connected by a shaft 36A to, for example, an air cylinder 36.

In the example shown in FIG. 2, air cylinder 36 is connected through a valve 43 to a source of compressed air 44. While various arrangements may be used within the scope of the present invention to activate air cylinder 36 which may be spring-biased to the upward position so that application of compressed air to cylinder forces platen 37 down and release of air pressure releases platen 37.

As shown in FIG. 2, operation of air cylinder 36 can be interlocked with rotation of table 11 by means of a switch 54 and a cam wheel 51 carried by shaft 46, which also carries and rotates table 11, as hereinafter described. Specifically, cam wheel 51 is provided with four depressed segments 51A–51D and switch 54 is provided with a cam follower lever 54A where switch 54 is actuated to operate valve 43 when follower 54A is received in depressions 51A–51D. Obviously, in the arrangement shown, cam wheel 51 is oriented on shaft 46 so that every rotation of table 11 to a point where object receiving stations, with objects to be sectioned located thereon (where rotation of table 11 ceases momentarily as described hereinafter), into aligned relation with pushers 38A and 38B aligns cam wheel 51 so follower 54A is received in a depression 51A–51D of cam wheel 51. Follower 54A then actuates valve 43 to admit, in the example shown, compressed air to air cylinder 36 to drive platen 37 and pushers 38A and 38B downwardly as described hereinafter. It will also be understood that cam wheel 51 is advantageously adapted and oriented on shaft 46 so that for every rotation of table 11 where two newly loaded receiving stations are located beneath pushers 38A and 38B, valve 43 is actuated. It will be further understood that valve 43 is reset after a full stroke. That is, after shaft 36A is fully extended, the actuating air can be released so that the shaft 36A is retracted into cylinder 36 by the bias spring previously discussed to withdraw pushers 38A, 38B from the aligned receiving stations to permit the next indexing cycle of table 11.

Figure 5:
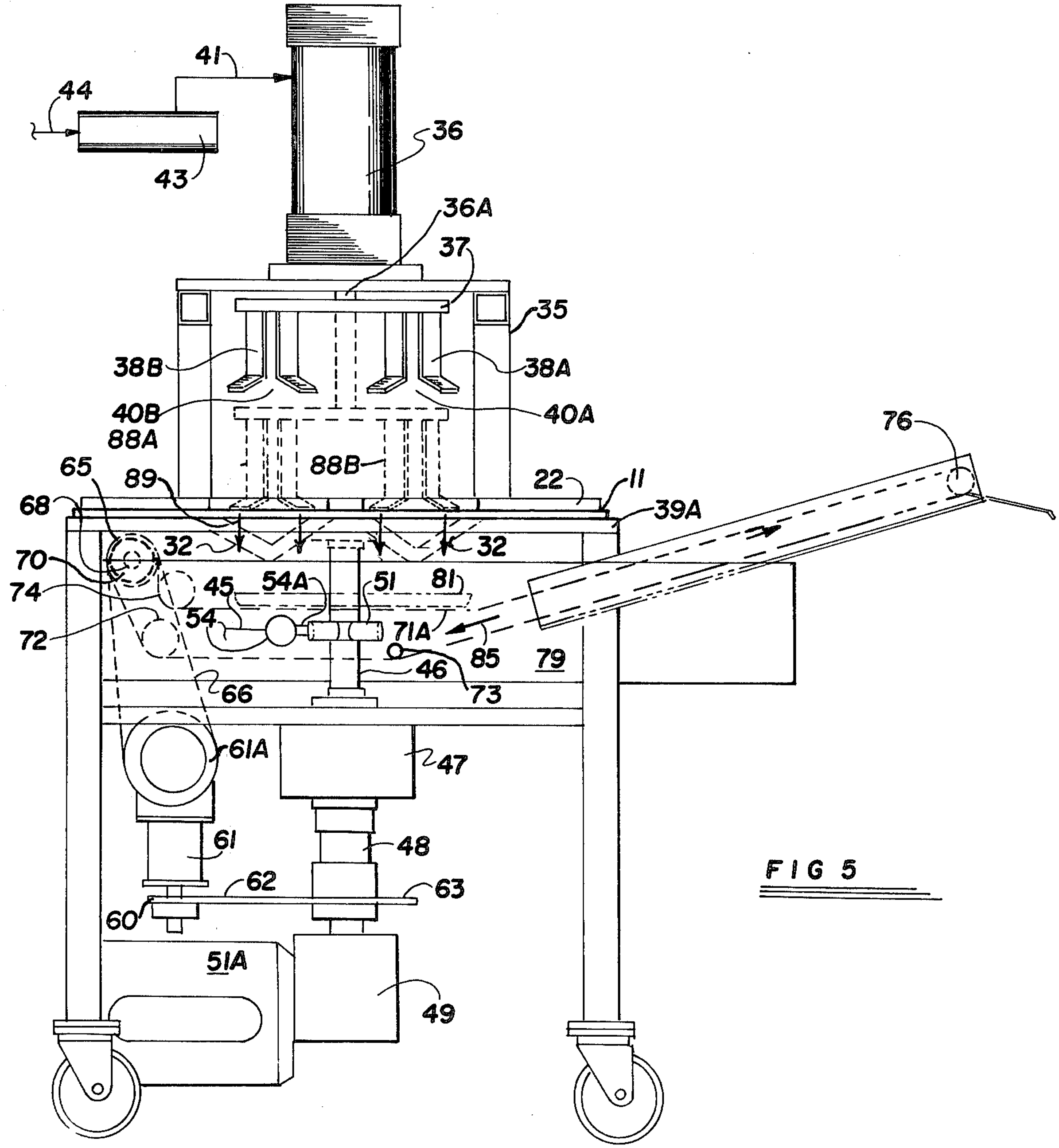
FIG. 5, which is a plan view illustrating a drive arrangement which can be utilized in a device within the scope of the present invention as shown in FIG. 1.

Referring now to FIG. 5 which illustrates the relative position and operation of one example of a device within the scope of the present invention, a cabinet designated generally 39 (FIG. 1) and including cooperative frame members, is provided to secure the elements described hereinafter.

As shown in the figure, table 11 is connected to and mounted for rotation on a stub shaft 46 where table 11 carries stations 22 and is supported on a base 39A having apertures where cutters 32 are fixed in aligned relation within the apertures so that when a cutting station 22 is aligned with a cutter 32 as shown in FIG. 3, the object to be sectioned and a pusher assembly 38A or 38B are in aligned relation with one of the apertures. Of course, it will be recognized that it is only necessary to provide so many apertures as there are pusher assemblies 38A or 38B. As shown in FIGS. 1 and 5, a frame 35 can be provided to support air cylinder 36 which is activated by valve 43 in response to rotation of shaft 46 as described hereinbefore. As shown in FIG. 5, cylinder 36 urges pushers 38A and 38B downwardly through the position shown in shadow lines 88A and 88B and to the distance illustrated by arrows 89 where the cutters 32A–32D are received between the fingers of pushers 38A and 38B to assure a complete cut through the object to be sectioned.

The sectioned pieces fall from cutters 32 to be received on a conveyor 71, more particularly, a generally horizontal run 71A of conveyor 71.

Conveyor 71 is of the endless belt type and runs from an outer idler shaft 76 journaled at opposite ends between cooperative sidewalls 77 and 78 (FIG. 1) downwardly to an idler roller 73 journaled between opposite sidewalls of a wash tank 79, described hereinafter, thence to a second idler roller 72 likewise journaled and to a driven roller 70 carried on a shaft 68 journaled in tank 79 and driven by a sprocket 65 as described hereinafter. Belt 71 is connected from driven roller 70 beneath an idler roller 74 to horizontally spaced elongate guides 81 where belt 71 contacts the bottom of guides 81 to define the horizontal run 71A of conveyor 71 previously described which receives the sections cut by cutters 32. The sectional pieces are received in tank 79 which can be partially filled with wash liquid to wash or otherwise treat the sections. For example, in the case where apples are being sectioned, tank 79 can be supplied with a weak vinegar solution into which the apple sections drop to prevent discoloration of the exposed surfaces of the fruit. It will be recognized that in the example of a device within the scope of the present invention shown in FIG. 1, tank 79 is located at the rear of the device beneath pushers 38A and 38B. The width of tank 79 need only be sufficient to accomodate the diameter of apertures 16A and, as shown in FIG. 5, the length of tank 79 can be determined by the configuration of the path of conveyor 71.

Within the scope of the present invention, a drive and indexing means is provided to operate the table 11 and, indirectly, pushers 38A and 38B.

In the example shown in FIG. 5, an alternating current motor 51A is provided having its output shaft (not shown) connected to a synchrogear speed reduction device 49. The output shaft 48 of synchrogear 49 carries a sprocket 63 which drives an endless chain 62 which, likewise, drives a sprocket 60 of a right angle speed-reducing drive 61. The output from drive 61 is supplied to rotate output gear 61A to drive chain 66 adapted to rotate sprocket 65 to rotate roller 70 to drive conveyor belt 71. It will be understood that the linear speed of belt 71 is determined by the relative diameter of sprockets 63, 60, 61A and 65 so that by proper selection of the diameter of any two, the linear speed of conveyor belt 71 can be determined.

Turning now to the rotation of table 11 and the operation of air cylinder 36, synchronization of operation of the two functions is, of course, of utmost importance. Table 11 is indexed, for sequential rotation allowing time between cycles for operation of air cylinder 36 so it is necessary, at the outset that the "pause" period between successive movements of table 11 be sufficiently long to allow a complete cycle of cylinder 36. In this regard, it was previously suggested that the cycle time of cylinder 36 can be determined by valve 43, which applies air to cylinder 36 to drive platen 37 down then releases the air pressure, and by the spring constant of the bias spring (not shown) which returns platen 37 to the "up" position when the air pressure is released. It will be understood that the foregoing determine the minimum pause period between successive movements of table 11.

As previously described, the arrangement in accordance with the present invention shown in the figures provides eight object receiving stations where two of the stations are positioned beneath platen 37 with each movement of table 11 so table 11 is rotated through 90° with each successive movement thereof.

As previously described, table 11 is driven by a shaft 46 located on a vertical axis 21 where shaft 46 is intermittently driven by a Warner TM clutch brake (Model CB-6) with a four-stop collar where overtravel stop and anti-backup features can be provided. The clutch brake 47 is driven by shaft 48 of synchrongear speed reducer 49 so shaft 46 driven by clutch brake 47 rotates shaft 46, and cam wheel 51 one quarter turn for each cycle. The four-stop collar is selected so time between each cycle of rotation is advantageously greater than the cycle time of cylinder 36. Alternatively, where the clutch brake has a fixed time between movements the bias spring (not shown) of cylinder 36 can be selected to accomodate the "pause" period of the clutch brake.

In operational summary, the objects to be sectioned are placed on hopper 1 and they are supplied therefrom to conveyor 2 where they travel to bar 3 where they are retained. The objects are then placed, two at a time on "paired" receiving stations, that is, a pair of stations which are rotated simultaneously to position under platen 37. Clutch brake 47, driven by motor 51 through synchrogear 49 then rotates table 11, by quarter turns, to position under platen 37. Almost simultaneously, cam follower 54A is received in a depression, for example, 51C of cam wheel 54 thereby actuating valve 43 to apply air pressure from line 44 to air cylinder 36 thereby driving platen 37 downwardly where fingers 40A and 40B of pushers 38A and 38A, respectively, push the objects to be sectioned through supports 27 of stations 22 and further through cutters 32 to section the objects.

Platen 37 then retracts pushers 38A and 38B according to factors previously described at which time table 11 is activated to rotate two new stations to position under platen 37.

Also, as previously described, the sectional pieces are received on conveyor belt 71 within tank 79 and conveyed out of the tank for further processing or use.

Having fully described one example in accordance with the present invention it is to be understood that various other arrangements within the scope of the present invention will occur to those skilled in the art upon reading the disclosure set forth hereinbefore.

The invention claimed is:

1. A cutting device for cutting generally round objects into sections including:

(a) a generally circular rotatable table, at least one first aperture means having a diameter greater than the diameter of the objects located within the periphery of said table and extending therethrough where the center of each first aperture lies on a circle concentric with said table and a radius less than the radius of said table;

(b) object receiving stations located on the upper surface of said table where an object receiving station is provided over each aperture and includes deformable support means to permit the object to be sectioned to pass through the deformable support means and the respective table aperture;

(c) extensible-retractible pusher means located above said table and disposed to be extended through at least one of said deformable support means of one of said receiving stations;

(d) cutter means having at least one blade located in aligned relation with said pusher means whereby an object to be sectioned is pushed through said deformable support means and said cutter means by said pusher means; and (e) indexing drive means adapted to rotate said table from a first position where the objects to be sectioned are placed on one of said receiving stations to a second position where said object rests on said receiving station in aligned relation between said cutter means and said pusher means, actuate said pusher means to push said object through said support means and said cutter means and retract said pusher means while said table is in said second position, then rotate said table to align other receiving station means between said pusher means and said cutter means.

2. The invention of claim 1 wherein said receiving stations include ring means attached to the periphery of said aperture wherein said deformable support means includes flexible sheet means retained by and suspended across said ring means where said flexible sheet means includes slits radiating from the center thereof to form a portion of said sheet within said ring into leaves and provide an opening at the center thereof whereby said object rests on said leaves defined within said sheet and is pushed therethrough when said pusher is extended and conducts said object to urge said object toward said cutter means.

3. The invention of claim 1 wherein said cutter means includes at least three blade means and wherein said blades radiate outwardly from a center.

4. The inveniton of claim 3 wherein said cutter means is concave with the center at the low point and wherein said concave side of said cutter means is upwardly open to receive said object from said support means.

5. The invention of claim 2 wherein said cutter means includes a multiplicity of intersecting blade means.

6. The invention of claim 1 wherein said pusher means includes extensible retractable shaft means disposed in aligned relation with said cutter means and at least two finger means extending from said shaft in generally spaced parallel relation where said fingers also extend parallel to the longitudinal axis of said shaft and where spaces between said fingers are adapted to receive selected blades of said cutter means when said pusher means is fully extended.

7. The invention of claim 1 wherein said index drive means includes motor means to drive clutch brake means connected to rotate said table means through a portion of a circle and stop said table with selected receiving station means in aligned relation between said pusher means and said cutter means for a selected first time interval then rotate said table through a second portion of a circle and stop said table for a second interval of time to position second receiving station means in aligned relation between said pusher means and said cutter means.

8. The invention of claim 7 wherein said indexing drive means includes sensor means to detect periods when rotation of said table means ceases and pusher drive means responsive to said sensor to urge said pusher means through said object receiving station and retract said pusher means therefrom while said table means is at rest.

* * * * *